(12) United States Patent
Togashi

(10) Patent No.: US 7,808,768 B2
(45) Date of Patent: Oct. 5, 2010

(54) MULTILAYER CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 253 days.

(21) Appl. No.: 12/210,671

(22) Filed: Sep. 15, 2008

(65) Prior Publication Data

US 2009/0109596 A1 Apr. 30, 2009

(30) Foreign Application Priority Data

Oct. 31, 2007 (JP) ............................. 2007-284186

(51) Int. Cl.
*H01G 4/005* (2006.01)
*H01G 4/06* (2006.01)
(52) U.S. Cl. ...................... 361/303; 361/311
(58) Field of Classification Search .................. 361/303, 361/305, 311
See application file for complete search history.

(56) References Cited

U.S. PATENT DOCUMENTS

| | | | |
|---|---|---|---|
| 5,880,925 A * | 3/1999 | DuPre et al. ................ | 361/303 |
| 7,085,124 B2 * | 8/2006 | Togashi ...................... | 361/303 |
| 7,646,584 B2 * | 1/2010 | Togashi ...................... | 361/303 |
| 7,667,950 B2 * | 2/2010 | Togashi ................... | 361/306.3 |
| 7,706,123 B2 * | 4/2010 | Togashi et al. .............. | 361/303 |
| 2006/0221545 A1 * | 10/2006 | Togashi ...................... | 361/303 |
| 2006/0221546 A1 * | 10/2006 | Togashi ...................... | 361/303 |
| 2006/0291137 A1 * | 12/2006 | Lee et al. ..................... | 361/303 |
| 2007/0019363 A1 * | 1/2007 | Roy ........................... | 361/303 |
| 2007/0019364 A1 * | 1/2007 | Roy ........................... | 361/303 |

FOREIGN PATENT DOCUMENTS

JP A-2004-296940 10/2004

\* cited by examiner

*Primary Examiner*—Eric Thomas
(74) *Attorney, Agent, or Firm*—Oliff & Berridge, PLC

(57) ABSTRACT

An element body has first and second inner electrodes which are alternately laminated. The first inner electrode has a first main electrode, a first coupling conductor extending to a first side face of the element body while being connected to an edge part of the first main electrode, and a first lead conductor extending to a third side face while being connected to the first coupling conductor. The second inner electrode has a second main electrode, a second coupling conductor extending to the first side face of the element body while being connected to an edge part of the second main electrode, and a second lead conductor extending to a fourth side face while being connected to the second coupling conductor. The first and second lead conductors are separated from the first and second main electrodes by gaps, respectively.

8 Claims, 8 Drawing Sheets

(a)

(b)

(a)

(b)

(a)

(b)

(a)

(b)

(a)

(b)

(a)

(b)

MULTILAYER CAPACITOR

BACKGROUND OF THE INVENTION

1. Field of the Invention

The present invention relates to a multilayer capacitor.

2. Related Background Art

Conventionally known is a multilayer capacitor comprising an element body in which first and second inner electrodes are alternately laminated with insulating layers interposed therebetween, and first and second terminal electrodes provided on side faces of the element body while being insulated from each other, which is mounted to a mounting substrate such that a surface parallel to the laminating direction in the side faces of the element body opposes a main surface of the mounting substrate.

An example of this kind of multilayer capacitor is one disclosed in Japanese Patent Application Laid-Open No. 2004-296940. In the multilayer capacitor disclosed in Japanese Patent Application Laid-Open No. 2004-296940, the element body is shaped like a rectangular parallelepiped and has a first side face opposing a main surface of a mounting substrate, a second side face opposing the first side face, a third side face which connects the first and second side faces to each other and is parallel to the laminating direction, and a fourth side face opposing the third side face. A first terminal electrode is provided on the third side face, while a second terminal electrode is provided on the fourth side face.

In the multilayer capacitor disclosed in Japanese Patent Application Laid-Open No. 2004-296940, one end part of the first inner electrode is exposed at the third side face and connected to the first terminal electrode. One end part of the second inner electrode is exposed at the fourth side face and connected to the second terminal electrode. When seen from the third side face, the one end parts of the first and second inner electrodes are wider than their center parts, respectively.

SUMMARY OF THE INVENTION

Meanwhile, there is a case where a multilayer capacitor is used as a decoupling capacitor. The following are required when using a multilayer capacitor as a decoupling capacitor.

Power supplies used for central processor units (CPUs) mounted in digital electronic devices have been increasing their load currents, while lowering their voltages. Therefore, a multilayer capacitor known as decoupling capacitor has been connected to a power supply, so as to feed a current from the multilayer capacitor to a CPU when the load current fluctuates transiently, thereby suppressing the fluctuation of the power supply voltage. Recently, as the CPUs have further been attaining higher frequencies, the load currents have been becoming faster and greater, so that the multilayer capacitor employed as the decoupling capacitor has been required to enhance ESR and reduce ESL while increasing its capacity.

However, the multilayer capacitor disclosed in Japanese Patent Application Laid-Open No. 2004-296940 has a low ESR, since the one end parts of the first and second inner electrodes are wider than their center parts. Therefore, the multilayer capacitor disclosed in Japanese Patent Application Laid-Open No. 2004-296940 has room for improvement in enhancing the ESR.

Further, since the first inner electrode is connected to the third side face while the second inner electrode is connected to the fourth side face that opposes the third side face, currents flow through the first and second inner electrodes in the same direction in the multilayer capacitor disclosed in Japanese Patent Application Laid-Open No. 2004-296940, thereby increasing the ESL. Hence, the multilayer capacitor disclosed in Japanese Patent Application Laid-Open No. 2004-296940 also leaves room for improvement in reducing the ESL.

It is therefore an object of the present invention to provide a multilayer capacitor which can reduce the ESL and enhance the ESR.

The present invention provides a multilayer capacitor comprising an element body having first and second inner electrodes alternately laminated with an insulating layer interposed therebetween, and first and second terminal electrodes arranged on an outer surface of the element body while being insulated from each other, a surface extending along the laminating direction in side faces of the element body acting as a mounting surface; wherein, as the side faces, the element body has first and second side faces extending along the laminating direction while opposing each other, and third and fourth side faces extending along the laminating direction and a direction intersecting the first and second side faces while opposing each other; wherein the first inner electrode of the element body has a first main electrode, a first coupling conductor extending to the first side face while being connected to an end part positioned on the first side face side of the first main electrode, and a first lead conductor connected to the first coupling conductor and exposed out of the element body while extending to the third side face so as to connect with the first terminal electrode; wherein the second inner electrode of the element body has a second main electrode, a second coupling conductor extending to the first side face while being connected to an end part positioned on the first side face side of the second main electrode, and a second lead conductor connected to the second coupling conductor and exposed out of the element body while extending to the fourth side face so as to connect with the second terminal electrode; wherein the first coupling conductor and first lead conductor are kept from overlapping the second coupling conductor and second lead conductor when seen in the laminating direction; wherein the first and second lead conductors are separated from the first and second main electrodes by gaps, respectively; wherein the first and second main electrodes include respective first and second capacity forming areas overlapping each other when seen in the laminating direction; wherein a connecting part between the first main electrode and the first coupling conductor is positioned between an end part on the third side face side and an end part on the fourth side face side in the first capacity forming area when seen in the opposing direction of the first and second side faces; and wherein a connecting part between the second main electrode and the second coupling conductor is positioned between an end part on the third side face side and an end part on the fourth side face side in the second capacity forming area when seen in the opposing direction of the first and second side faces.

In the multilayer capacitor in accordance with the present invention, the first inner electrode has the first coupling conductor connecting the first lead conductor and the first main electrode to each other, while the second inner electrode has the second coupling conductor connecting the second lead conductor and the second main electrode to each other. Since the first and second coupling conductors are connected to respective parts of the first and second main electrodes, current paths of the first and second inner electrodes include locations where they are narrowed, whereby the ESR is enhanced.

The first coupling conductor is connected to an edge part positioned on the first side face side of the first main electrode, while the second coupling conductor is connected to an edge part positioned on the first side face side of the second main electrode. Therefore, the first and second coupling conductors are positioned close to each other. The connecting part between the first coupling conductor and first main electrode and the connecting part between the second coupling conductor and second main electrode, which are in such a positional relationship, allow respective currents to flow in directions opposite from each other, whereby magnetic fields caused by the currents cancel each other out. As a result, the ESL of the multilayer capacitor can be lowered.

Further, the first and second main electrodes include first and second capacity forming areas overlapping each other, respectively. The connecting part between the first main electrode and first coupling conductor and the connecting part between the second main electrode and second coupling conductor are positioned between both end parts of their corresponding capacity forming areas. Therefore, currents directed opposite from each other flow through the first and second capacity forming areas, respectively, at both end parts. As a result, magnetic fields caused by the currents in the first and second inner electrodes partly cancel each other out, whereby the ESL of the multilayer capacitor can further be lowered.

Preferably, the first side face is the mounting surface, the first and second terminal electrodes are arranged on the first side face, and respective side faces of the first and second lead conductors along the extending direction are exposed at the first side face.

In this case, the exposed areas of the first and second lead conductors become wider, whereby contact areas can sufficiently be secured between the first lead conductor and first terminal electrode and between the second lead conductor and second terminal electrode. As a result, connectivity can be enhanced between the first inner electrode and first terminal electrode and between the second inner electrode and second terminal electrode. Since the first and second terminal electrodes are positioned on the mounting surface, it becomes easier for the multilayer capacitor to connect with a substrate or the like.

Preferably, the first terminal electrode is arranged on the first, second, and third side faces; the second terminal electrode is arranged on the first, second, and fourth side faces; the first inner electrode further has a third coupling conductor extending to the second side face while being connected to an edge part on the second side face side of the first main electrode, and a third lead conductor extending to the third side face while being connected to the third coupling conductor and exposed at least one of the second and third side faces so as to connect with the first terminal electrode; the second inner electrode further has a fourth coupling conductor extending to the second side face while being connected to an edge part on the second side face side of the second main electrode, and a fourth lead conductor extending to the fourth side face while being connected to the fourth coupling conductor and exposed at least one of the second and fourth side faces so as to connect with the second terminal electrode; the third coupling conductor and third lead conductor are kept from overlapping the fourth coupling conductor and fourth lead conductor when seen in the laminating direction; the third and fourth lead conductors are separated from the first and second main electrodes by gaps, respectively; a connecting part between the first main electrode and the third coupling conductor is positioned between an end part on the third side face side and an end part on the fourth side face side in the first capacity forming area when seen in the opposing direction of the first and second side faces; and a connecting part between the second main electrode and the fourth coupling conductor is positioned between an end part on the third side face side and an end part on the fourth side face side in the second capacity forming area when seen in the opposing direction of the first and second side faces.

In this case, the first inner electrode and first terminal electrode are connected to each other through not only the first lead conductor but also the third lead conductor. The second inner electrode and second terminal electrode are connected to each other through not only the second lead conductor but also the fourth lead conductor. Therefore, connectivity can be enhanced between the first inner electrode and first terminal electrode and between the second inner electrode and second terminal electrode.

As current paths to the first main electrode, the first inner electrode has not only a path reaching the first main electrode through the first lead conductor, but also a path reaching the first main electrode through the third lead conductor. When a current is supplied from the first side face side of the element body, the current path reaching the first main electrode through the third lead conductor is longer than the current path reaching the first main electrode through the first lead conductor. Similarly, in the second inner electrode, the current path reaching the second main electrode through the fourth lead conductor is longer than the current path reaching the second main electrode through the second lead conductor. Therefore, longer current paths are formed, whereby the ESR of the multilayer capacitor increases.

Preferably, respective side faces of the third and fourth lead conductors along the extending direction are exposed at the second side face.

In this case, the exposed areas of the third and fourth lead conductors become wider, whereby contact areas can sufficiently be secured between the third lead conductor and first terminal electrode and between the fourth lead conductor and second terminal electrode. As a result, connectivity can be enhanced between the first inner electrode and first terminal electrode and between the second inner electrode and second terminal electrode.

Preferably, the first inner electrode further has a fifth coupling conductor for connecting the first and third lead conductors to each other; the second inner electrode further has a sixth coupling conductor for connecting the second and fourth lead conductors to each other; the fifth and sixth coupling conductors are separated from the first and second main electrodes by gaps, respectively; the fifth coupling conductor is exposed at the third side face and connected to the first terminal electrode; and the sixth coupling conductor is exposed at the fourth side face and connected to the second terminal electrode.

In this case, the first inner electrode and first terminal electrode are connected to each other through not only the first and third lead conductors but also the fifth coupling conductor. The second inner electrode and second terminal electrode are connected to each other through not only the second and fourth lead conductors but also the sixth coupling conductor. Therefore, connectivity can further be enhanced between the first inner electrode and first terminal electrode and between the second inner electrode and second terminal electrode.

Preferably, the first inner electrode further has a third coupling conductor extending to the second side face while being connected to an edge part on the second side face side of the first main electrode, a third lead conductor extending to the third side face while being connected to the third coupling conductor, and a fifth coupling conductor for connecting the first and third lead conductors to each other; the second inner electrode further has a fourth coupling conductor extending to the second side face while being connected to an edge part on the second side face side of the second main electrode, a fourth lead conductor extending to the fourth side face while being connected to the fourth coupling conductor, and a sixth coupling conductor for connecting the second and fourth lead conductors to each other; the third coupling conductor and third lead conductor are kept from overlapping the fourth coupling conductor and fourth lead conductor when seen in the laminating direction; the third lead conductor and fifth coupling conductor are separated from the first main electrode by a gap; the fourth lead conductor and sixth coupling conductor are separated from the second main electrode by a gap; a connecting part between the first main electrode and third coupling conductor is positioned between end parts on the third and fourth side face sides of the first capacity forming area; a connecting part between the second main electrode and fourth coupling conductor is positioned between end parts on the third and fourth side face sides of the second capacity forming area; and the fifth and sixth coupling conductors are held within the element body.

In this case, a current supplied to the first and second terminal electrodes provided on the first side face side of the element body flows through a path reaching the first main electrode through the first lead conductor and a path reaching the first main electrode through the fifth coupling conductor and third lead conductor. The current also flows through a path reaching the second main electrode through the second lead conductor and a path reaching the second main electrode through the sixth coupling conductor and fourth lead conductor. The path reaching the first main electrode through the fifth coupling conductor and third lead conductor is longer than the path reaching the first main electrode through the first lead conductor. The path reaching the second main electrode through the sixth coupling conductor and fourth lead conductor is longer than the path reaching the second main electrode through the second lead conductor. Thus providing relatively long current paths can enhance the ESR of the multilayer capacitor.

Preferably, third and fourth terminal electrodes insulated from each other are arranged on the second side face; a side face of the third lead conductor along the extending direction is exposed at the second side face and connected to the third terminal electrode; and a side face of the fourth lead conductor along the extending direction is exposed at the second side face and connected to the fourth terminal electrode.

In this case, the inner electrodes can be connected to the terminal electrodes on the first and second side faces of the element body but not on the third and fourth side faces. This can yield a greater resistance component than when the inner electrodes are connected to the terminal electrodes on the first to fourth side faces, whereby the ESR of the multilayer capacitor can further be enhanced. By changing the widths of the fifth and sixth coupling conductors that are not exposed out of the element body, the ESR can be controlled easily and accurately.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments of the present invention will be explained in detail with reference to the accompanying drawings. In the explanation, the same constituents or those having the same functions will be referred to with the same numerals or letters while omitting their overlapping descriptions.

First Embodiment

Figure 1:
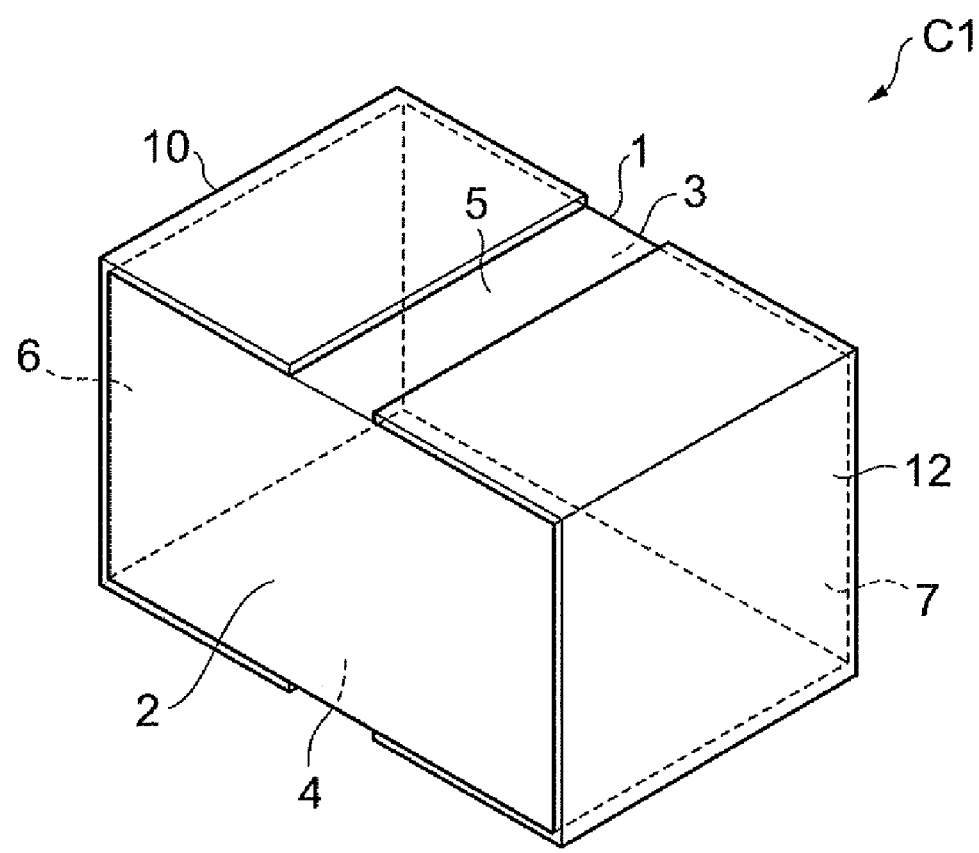
FIG. 1 is a perspective view of the multilayer capacitor in accordance with a first embodiment.
Figure 2:
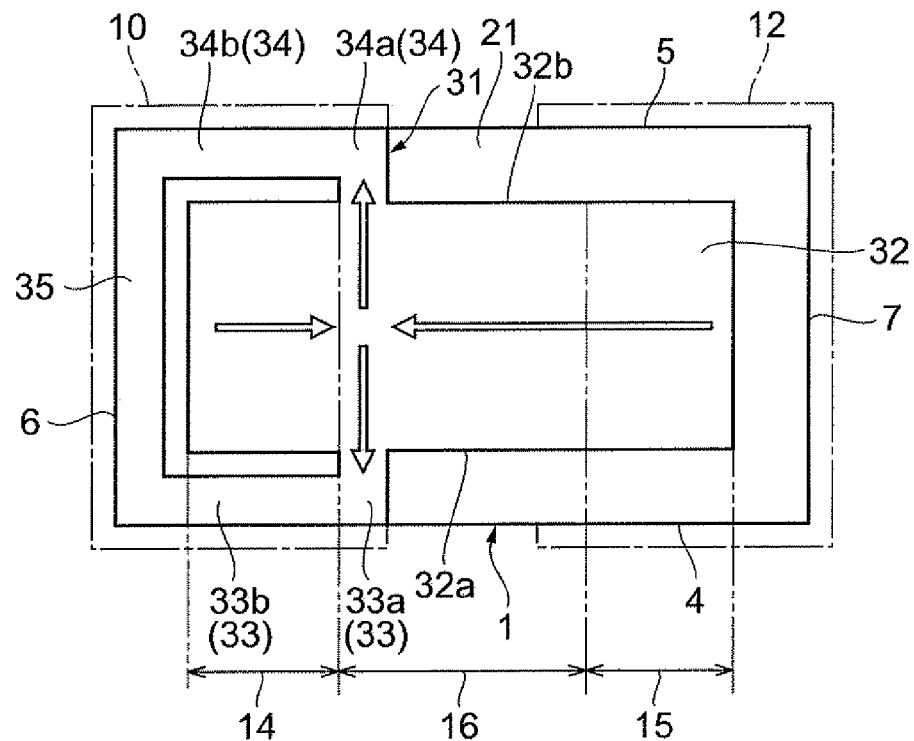
FIG. 2 is a view showing structures of inner electrodes in the multilayer capacitor in accordance with the first embodiment.
Figure 2:
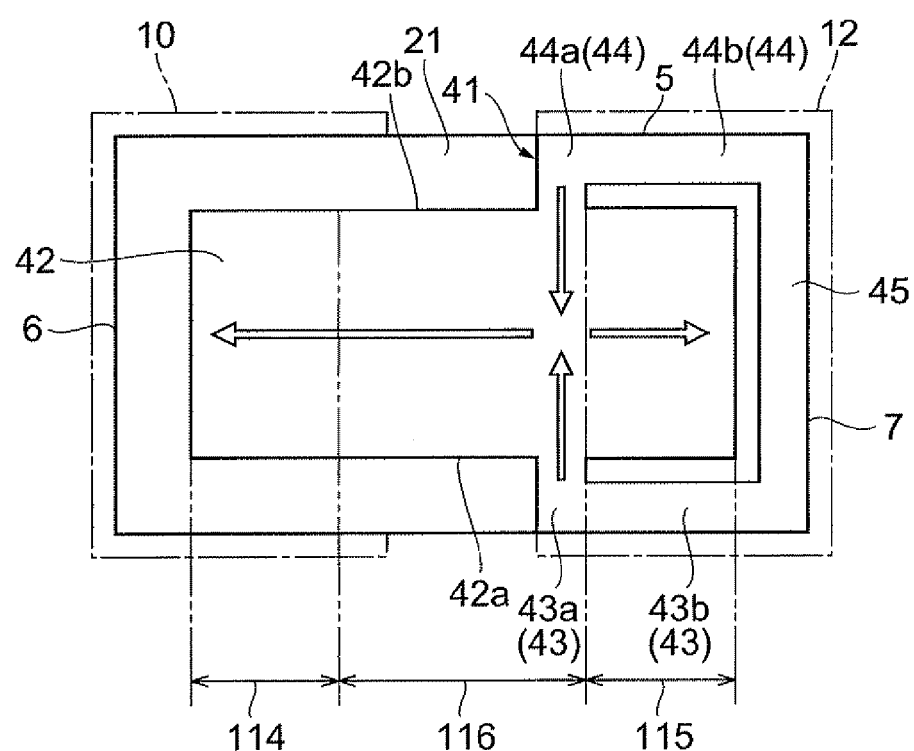

FIG. 1 is a perspective view of the multilayer capacitor in accordance with the first embodiment. FIG. 2 is a view showing structures of inner electrodes in the multilayer capacitor in accordance with the first embodiment.

As shown in FIG. 1, the multilayer capacitor C1 comprises an element body 1 shaped like a rectangular parallelepiped, and first and second terminal electrodes 10, 12 which are arranged on outer surfaces of the element body 1. The element body 1 includes rectangular first and second main faces 2, 3, first and second side faces 4, 5 opposing each other, and third and fourth side faces 6, 7 opposing each other. The first and second side faces 4, 5 extend in the shorter side direction of the first and second main faces 2, 3 so as to connect the first and second main faces 2, 3 to each other. The third and fourth side faces 6, 7 extend in the longer side direction of the first and second main faces 2, 3 so as to connect the first and second side faces 4, 5 to each other. The first side face 4 becomes a mounting surface in the multilayer capacitor C1. When mounting the multilayer capacitor C1 to a mounting substrate (not depicted), the first side face 4 is opposed to the mounting substrate.

The first terminal electrode 10 is arranged on the third side face 6 of the element body 1. The first terminal electrode 10 is formed such as to cover the third side face 6 and extend over the first and second side faces 4, 5. The second terminal electrode 12 is arranged on the fourth side face 7 of the element body 1. The second terminal electrode 12 is formed such as to cover the fourth side face 7 and extend over the first and second side faces 4, 5. The first and second terminal electrodes 10, 12 are formed, for example, by applying and burning a conductive paste containing a conductive metal powder and glass frit onto their corresponding outer surfaces of the element body 1. A plating layer may be formed on the burned electrode when necessary.

As shown in FIG. 2, the element body I has a plurality of insulating layers 21, a plurality of first inner electrodes 31, and a plurality of second inner electrodes 41. Each of the insulating layers 21 extends in a direction parallel to the first and second main faces 2, 3. Therefore, the first to fourth side faces 4 to 7 are surfaces extending along the laminating direction of the insulating layers 21, while the first and second main faces 2, 3 are surfaces opposing each other in the laminating direction of the insulating layers 21. Each of the insulating layers 21 is constituted by a sintered body of a ceramic green sheet containing a dielectric ceramic, for example. In the actual multilayer capacitor C1, the insulating layers 21 are integrated to such an extent that their boundaries are invisible.

The first and second inner electrodes 31, 41 are alternately laminated with at least one insulating layer 21 interposed therebetween. The first and second inner electrodes 31, 41 are constituted by sintered bodies of a conductive paste.

As shown in FIG. 2(a), each first inner electrode 31 has a first main electrode 32, a first lead part 33, a third lead part 34, and a fifth coupling conductor 35. The first lead part 33, third lead part 34, and fifth coupling conductor 35 are exposed at the first to third side faces 4 to 6 and connected to the first terminal electrode 10 electrically and physically. As a consequence, the first inner electrode 31 is electrically connected to the first terminal electrode 10 of the element body 1.

The first main electrode 32 is shaped like a rectangle, whose longer side direction is that of the first and second main faces 2, 3. The first main electrode 32 has a pair of edge parts 32a, 32b extending in the longer side direction. The edge part 32a is positioned on the first side face 4 side, while the edge part 32b is positioned on the second side face 5 side.

The first main electrode 32 includes a first capacity forming area. The first capacity forming area is an area that overlaps a second main electrode 42, which will be explained later, when seen in the laminating direction of the insulating layers 21. In this embodiment, the first and second main electrodes 32, 42 totally overlap each other. Therefore, the first main electrode 32 as a whole becomes the first capacity forming area. The first capacity forming area, i.e., first main electrode 32, is constituted by end parts 14, 15 and an intermediate part 16. The end part 14 is positioned on the third side face 6 side of the element body 1, while the end part 15 is positioned on the fourth side face 7 side of the element body 1. The intermediate part 16 is positioned between the end parts 14, 15.

The first lead part 33 is connected to the first main electrode 32, while being positioned on the first side face 4 side when seen from the first main electrode 32. The first lead part 33 is constituted by a first coupling conductor 33a and a first lead conductor 33b. The first coupling conductor 33a extends from the edge part 32a of the first main electrode 32 to the first side face 4 of the element body 1, while having one end connected to the edge part 32a of the first main electrode 32 and the other end exposed at the first side face 4. The first coupling conductor 33a is connected to the intermediate part 16 of the first main electrode 32 when seen in the opposing direction of the first and second side faces 4, 5.

The first lead conductor 33b extends along the first side face 4 of the element body 1 to the third side face 6. The first lead conductor 33b has one end connected to the first coupling conductor 33a, and the other end exposed at the third side face 6. In the first lead conductor 33b, the surface extending along the first side face 4 is exposed at the first side face 4.

The first lead conductor 33b is separated from the first main electrode 32 by a gap. Therefore, in the first lead part 33, only an end portion of the first coupling conductor 33a is connected to the first main electrode 32. In the remaining portion, the first lead part 33 and the first main electrode 32 are not in contact with each other.

The third lead part 34 is connected to the first main electrode 32, while being positioned on the second side face 5 side when seen from the first main electrode 32. The third lead part 34 is constituted by a third coupling conductor 34a and a third lead conductor 34b.

The third coupling conductor 34a extends from the edge part 32b of the first main electrode 32 to the second side face 5 of the element body 1, while having one end connected to the edge part 32b of the first main electrode 32 and the other end exposed at the second side face 5. The connecting part between the third coupling conductor 34a and first main electrode 32 is located in the intermediate part 16 of the first main electrode 32 when seen in the opposing direction of the first and second side faces 4, 5.

The third lead conductor 34b extends along the second side face 5 of the element body 1 to the third side face 6. The third lead conductor 34b has one end connected to the third coupling conductor 34a, and the other end exposed at the third side face 6. In the third lead conductor 34b, the surface extending along the second side face 5 is exposed at the second side face 5.

The third lead conductor 34b is separated from the first main electrode 32 by a gap. Therefore, in the third lead part 34, only one end of the third coupling conductor 34a is connected to the first main electrode 32. In the remaining portion, the third lead part 34 and the first main electrode 32 are not in contact with each other.

The fifth coupling conductor 35 connects the first lead part 33 and third lead part 34 to each other. More specifically, the fifth coupling conductor 35 extends along the third side face 6 of the element body 1, while having one end connected to the other end part of the first lead conductor 33b in the first lead part 33, and the other end connected to the other end part of the third lead conductor 34b in the third lead part 34. In the fifth coupling conductor 35, the surface extending along the third side face 6 is exposed at the third side face 6. The fifth coupling conductor 35 is separated from the first main electrode 32 by a gap. Therefore, the fifth coupling conductor 35 and the first main electrode 32 are not in contact with each other.

As shown in FIG. 2(b), each second inner electrode 41 has a second main electrode 42, a second lead part 43, a fourth lead part 44, and a sixth coupling conductor 45. The second lead part 43, fourth lead part 44, and sixth coupling conductor 45 are exposed at the first, second, and fourth side faces 4, 5, 7 and connected to the second terminal electrode 12 electrically and physically. As a consequence, the second inner electrode 41 is electrically connected to the second terminal electrode 12. The second lead part 43, fourth lead part 44, and sixth coupling conductor 45 in the second inner electrode 41 are kept from overlapping the first lead part 33, third lead part 34, and fifth coupling conductor 35 in the first inner electrode 31. In the following, the constituents of the second inner electrode 41 will be explained in detail.

The second main electrode 42 is shaped like a rectangle, whose longer side direction is that of the first and second main faces 2, 3. The first main electrode 42 has an edge part 42a positioned on the first side face 4 side, and an edge part 42b positioned on the second side face 5 side.

The second main electrode 42 includes a second capacity forming area. The second capacity forming area is an area that overlaps the first main electrode 32 when seen in the laminating direction of the insulating layers 21. In this embodiment, the first and second main electrodes 32, 42 totally overlap each other. Therefore, the second main electrode 42 as a whole becomes the second capacity forming area. The second capacity forming area, i.e., second main electrode 42, is constituted by end parts 114, 115 and an intermediate part 116. The end part 114 is positioned on the third side face 6 side of the element body 1, while the end part 115 is positioned on the fourth side face 7 side of the element body 1. The intermediate part 116 is positioned between the end parts 114, 115.

The second lead part 43 is connected to the second main electrode 42, while being positioned on the first side face 4 side when seen from the second main electrode 42. The second lead part 43 is constituted by a second coupling conductor 43a and a second lead conductor 43b.

The second coupling conductor 43a extends to the first side face 4 of the element body 1, while having one end connected to the edge part 42a of the second main electrode 42. The other end of the second coupling conductor 43a is exposed at the first side face 4. The second coupling conductor 43a is connected to the intermediate part 116 of the second main electrode 42 when seen in the opposing direction of the first and second side faces 4, 5.

The second lead conductor 43b has one end connected to the second coupling conductor 43a, and the other end exposed at the fourth side face 7. The second lead conductor 43b extends along the first side face 4 of the element body 1 to the fourth side face 7. In the second lead conductor 43b, the surface extending along the first side face 4 is exposed at the first side face 4.

The second lead conductor 43b is separated from the second main electrode 42 by a gap. Therefore, in the second lead part 43, only one end of the second coupling conductor 43a is connected to the second main electrode 42. In the remaining portion, the second lead part 43 and the second main electrode 42 are not in contact with each other.

The fourth lead part 44 is connected to the second main electrode 42, while being positioned on the second side face 5 side when seen from the second main electrode 42. The fourth lead part 44 is constituted by a fourth coupling conductor 44a and a fourth lead conductor 44b.

The fourth coupling conductor 44a extends to the second side face 5 of the element body 1, while having one end connected to the edge part 42b of the second main electrode 42. The other end of the fourth coupling conductor 44a is exposed at the second side face 5. The connecting part between the fourth coupling conductor 44a and second main electrode 42 is located in the intermediate part 116 of the second main electrode 42 when seen in the opposing direction of the first and second side faces 4, 5.

The fourth lead conductor 44b has one end connected to the fourth coupling conductor 44a, and the other end exposed at the fourth side face 7. The fourth lead conductor 44b extends along the second side face 5 of the element body I to the fourth side face 7. In the fourth lead conductor 44b, the surface extending along the second side face 5 is exposed at the second side face 5.

The fourth lead conductor 44b is separated from the second main electrode 42 by a gap. Therefore, in the fourth lead part 44, only the fourth coupling conductor 44a is connected to the second main electrode 42. In the remaining portion, the fourth lead part 44 and the second main electrode 42 are not in contact with each other.

The sixth coupling conductor 45 connects the second lead part 43 and fourth lead part 44 to each other. More specifically, the sixth coupling conductor 45 extends along the fourth side face 7 of the element body 1, while having one end connected to the other end part of the second lead conductor 43b in the second lead part 43 and the other end connected to the other end part of the fourth lead conductor 44b in the fourth lead part 44. In the sixth coupling conductor 45, the surface extending along the fourth side face 7 is exposed at the fourth side face 7. The sixth coupling conductor 45 is separated from the second main electrode 42 by a gap. Therefore, the sixth coupling conductor 45 and the second main electrode 42 are not in contact with each other.

In thus constructed multilayer capacitor C1 in accordance with the first embodiment, the first inner electrode 31 has the first coupling conductor 33a connecting the first lead conductor 33b and first main electrode 32 to each other, while the second inner electrode 41 has the second coupling conductor 43a connecting the second lead conductor 43b and second main electrode 42 to each other. The first and second coupling conductors 33a, 43a are connected to respective parts of the first and second main electrodes 32, 42. Therefore, current paths of the first and second inner electrodes 31, 41 are formed such as to include locations where they are narrowed, whereby the ESR of the multilayer capacitor C1 is enhanced.

The first coupling conductor 33a is connected to the edge part 32a positioned on the first side face 4 side of the first main electrode 32, while the second coupling conductor 43a is connected to the edge part 42a positioned on the first side face 4 side of the second main electrode 42. Further, the first coupling conductor 33a is connected to the intermediate part 16 of the first main electrode 32, while the second coupling conductor 43a is connected to the intermediate part 116 of the second main electrode 42. Therefore, the first and second coupling conductors 33a, 43a are positioned close to each other. The connecting part between the first coupling conductor 33a and first main electrode 32 and the connecting part between the second coupling conductor 43a and second main electrode 42, which are in such a positional relationship, allow respective currents to flow in directions opposite from each other, whereby magnetic fields caused by the currents cancel each other out. As a result, the ESL of the multilayer capacitor C1 can be lowered. The arrows in FIG. 2 indicate the directions of current flows when the first and second terminal electrodes 10, 12 are used as a cathode and an anode, respectively.

The first coupling conductor 33a is located in the intermediate part 16 of the first main electrode 32 when seen in the opposing direction of the first and second side faces 4, 5. The second coupling conductor 43a is located in the intermediate part 116 of the second main electrode 42 when seen in the opposing direction of the first and second side faces 4, 5. Therefore, as shown in FIG. 2, currents flowing through the end parts 14, 15 of the first main electrode 32 are directed opposite from those flowing through their corresponding end parts 114, 115 of the second main electrode 42. As a result, magnetic fields caused by the currents in the first and second inner electrodes 31, 41 partly cancel each other out, whereby the ESL of the multilayer capacitor C1 can further be lowered.

Further, the first inner electrode 31 has the third coupling conductor 34a, while the second inner electrode 41 has the fourth coupling conductor 44a. As shown in FIG. 2, the current flowing through the third coupling conductor 34a is directed opposite from that in the first coupling conductor 33a. The current flowing through the fourth coupling conductor 44a is directed opposite from that in the second coupling conductor 43a. This can further lower the ESL.

The first terminal electrode 10 and first inner electrode 31 are connected to each other through not only the first lead conductor 33b but also the third lead conductor 34b. The second terminal electrode 12 and second inner electrode 41 are connected to each other through not only the second lead conductor 43b but also the fourth lead conductor 44b. Therefore, connectivity can be enhanced between the first terminal electrode 10 and first inner electrode 31 and between the second terminal electrode 12 and second inner electrode 41.

As current paths to the first main electrode 32, the first inner electrode 31 has not only a path reaching the first main electrode 32 through the first lead part 33, but also a path reaching the first main electrode 32 through the third lead part 34. When the multilayer capacitor C1 is mounted to a mounting substrate, since the first side face 4 is a mounting surface, the current path reaching the first main electrode 32 through the third lead part 34 is longer than the current path reaching the first main electrode 32 through the first lead part 33. Similarly, in the second inner electrode 41, the current path reaching the second main electrode 42 through the fourth lead part 44 is longer than the current path reaching the second main electrode 42 through the second lead part 43. Since longer current paths are thus formed, the ESR of the multilayer capacitor C1 increases.

In the multilayer capacitor C1, the first and second inner electrodes 31, 41 are partly exposed at the first to fourth side faces 4 to 7 of the element body 1, whereby contact areas can sufficiently be secured between the first terminal electrode 10 and first inner electrode 31 and between the second terminal electrode 12 and second inner electrode 41. As a result, connectivity can be enhanced between the first terminal electrode 10 and first inner electrode 31 and between the second terminal electrode 12 and second terminal electrode 41. Since the first and second terminal electrodes 10, 12 exist on the first side face 4 acting as the mounting surface, it becomes easier to connect the mounting surface and the multilayer capacitor C1 to each other.

Figure 3:
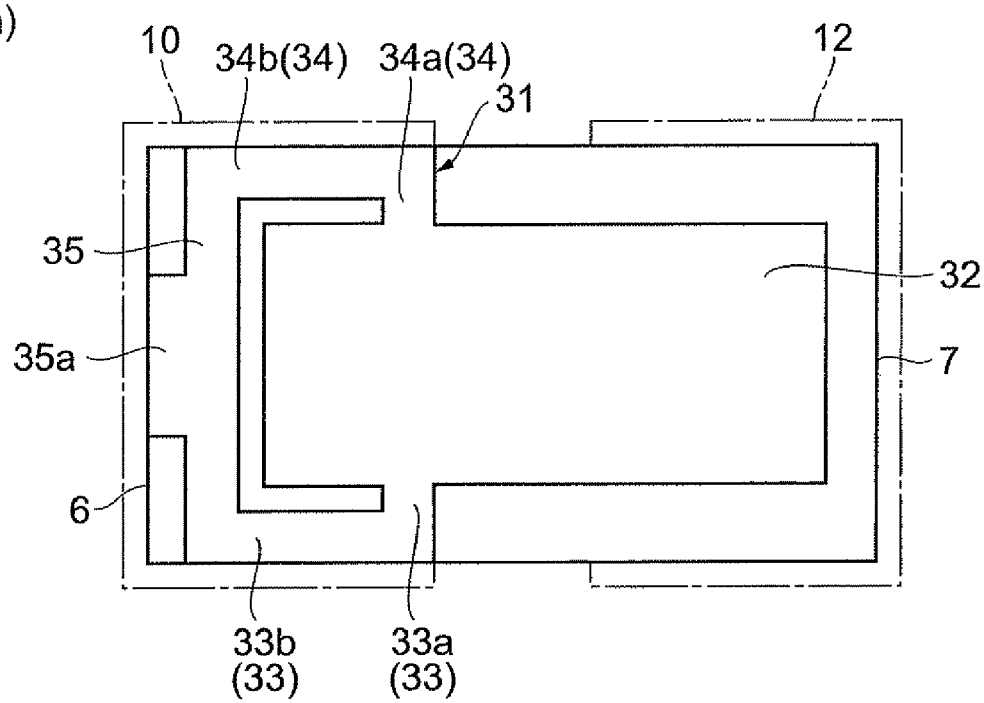
FIG. 3 is a view showing structures of inner electrodes in the multilayer capacitor in accordance with a modified example of the first embodiment.
Figure 3:
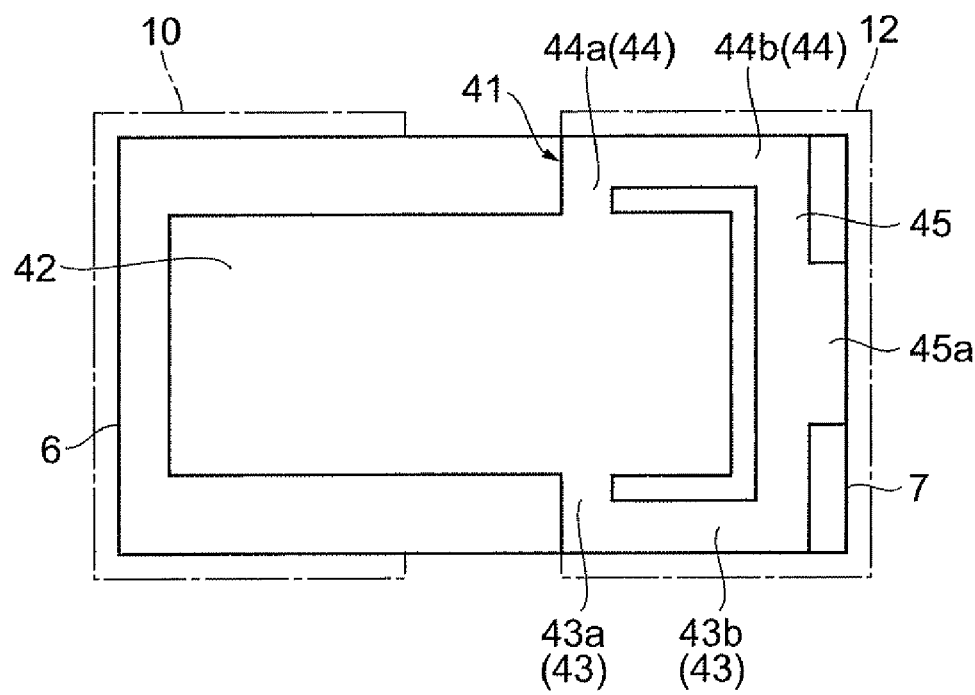

A modified example of the first embodiment will now be explained with reference to FIG. 3. FIG. 3 is a view showing structures of inner electrodes in the multilayer capacitor in accordance with this modified example of the first embodiment.

As with the multilayer capacitor C1 in accordance with the first embodiment, the multilayer capacitor in accordance with this modified example comprises an element body 1, a first terminal electrode 10, and a second terminal electrode 12 which are not depicted. The element body 1 has a plurality of insulating layers 21, a plurality of first inner electrodes 31, and a plurality of second inner electrodes 41.

As shown in FIG. 3, the multilayer capacitor in accordance with this modified example differs from that of the first embodiment in forms of the fifth coupling conductor 35 in the first inner electrode 31 and the sixth coupling conductor 35 in the second inner electrode 41. The fifth coupling conductor 35 in accordance with this modified example has a projection 35a directed to the third side face 6 between one end and the other end, while only an end face of the projection 35a is exposed at the third side face 6. The sixth coupling conductor 45 in accordance with this modified example has a projection 45a directed to the fourth side face 7 between one end and the other end, while only an end face of the projection 45a is exposed at the fourth side face 7.

The first and second terminal electrodes 10, 12 can come into contact with the first and second inner electrodes 31, 41, respectively, on the first to fourth side faces 4 to 7 in such a multilayer capacitor as well, whereby connectivity can be enhanced between the first inner electrode 31 and first terminal electrode 10 and between the second inner electrode 41 and second terminal electrode 12.

Figure 4:
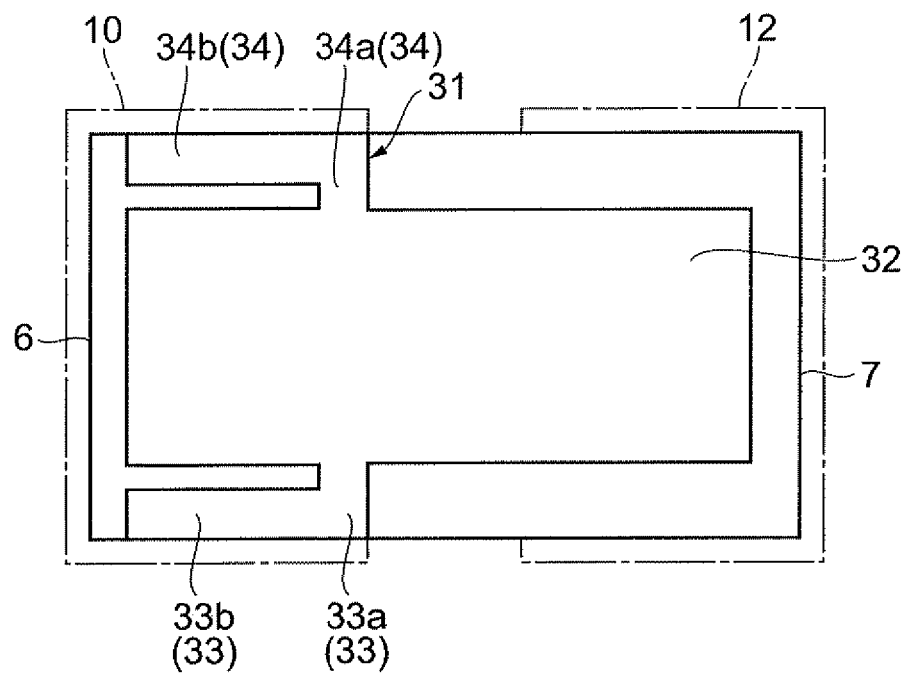
FIG. 4 is a view showing structures of inner electrodes in the multilayer capacitor in accordance with a modified example of the first embodiment.
Figure 4:
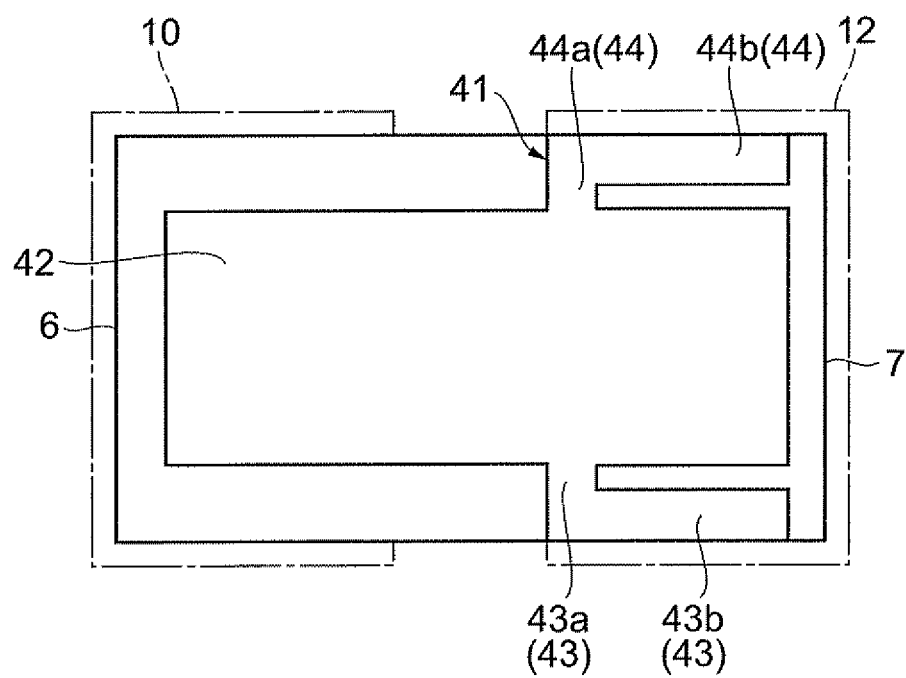

Another modified example of the first embodiment will now be explained with reference to FIG. 4. FIG. 4 is a view showing structures of inner electrodes in the multilayer capacitor in accordance with this modified example of the first embodiment.

As with the multilayer capacitor C1 in accordance with the first embodiment, the multilayer capacitor in accordance with this modified example comprises an element body 1, a first terminal electrode 10, and a second terminal electrode 12 which are not depicted. The element body 1 has a plurality of insulating layers 21, a plurality of first inner electrodes 31, and a plurality of second inner electrodes 41.

In the multilayer capacitor in accordance with this modified example, as shown in FIG. 4, the first and second inner electrodes 31, 41 do not have the first and second coupling parts 35, 45. The first lead conductor 33b in the first lead part 33 and the third lead conductor 34b in the third lead part 34 are not exposed at the third side face 6. The second lead conductor 43b in the second lead part 43 and the fourth lead conductor 44b in the fourth lead part 44 are not exposed at the fourth side face 7. Namely, the first and second inner electrodes 31, 41 are exposed at only the first and second side faces 4, 5.

As current paths to the first main electrode 32, a path reaching the first main electrode 32 through the first lead part 33 and a path reaching the first main electrode 32 through the third lead part 34 are formed in such a multilayer capacitor. When the multilayer capacitor C1 is mounted to a mounting substrate, since the first side face 4 is a mounting surface, the current path reaching the first main electrode 32 through the third lead part 34 is farther from the first side face 4 and accordingly longer than the current path reaching the first main electrode 32 through the first lead part 33. Similarly, in the second inner electrode 41, the current path reaching the second main electrode 42 through the fourth lead part 44 is farther from the first side face 4 and accordingly longer than the current path reaching the second main electrode 42 through the second lead part 43. Therefore, longer current paths are formed, whereby the ESR of the multilayer capacitor C1 can be increased.

Figure 5:
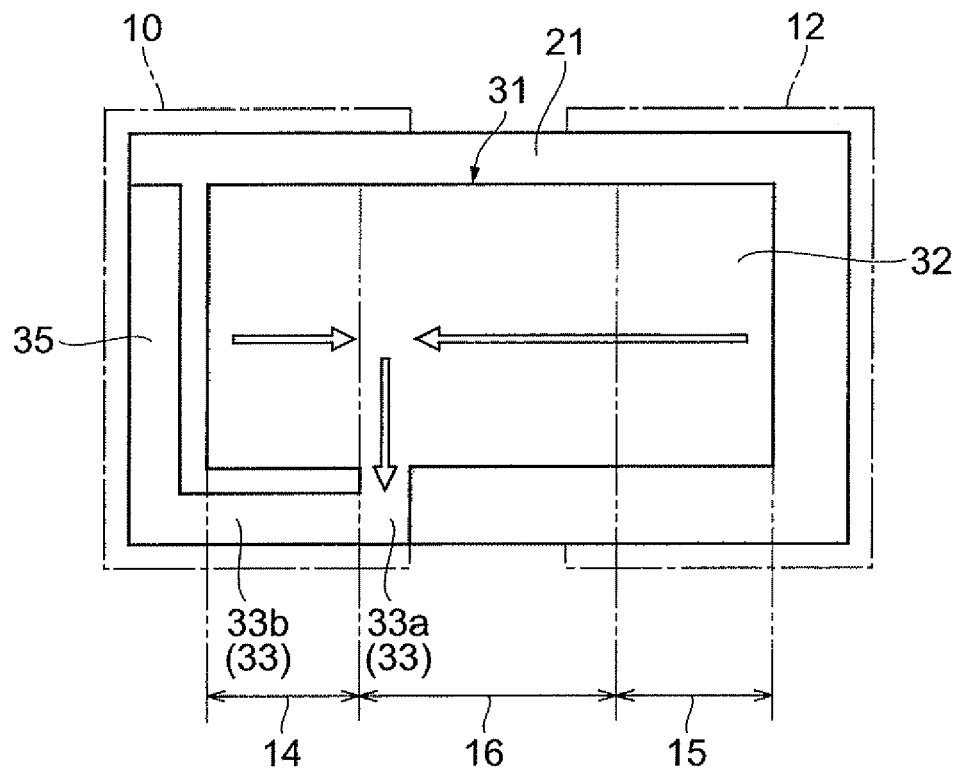
FIG. 5 is a view showing structures of inner electrodes in the multilayer capacitor in accordance with a modified example of the first embodiment.
Figure 5:
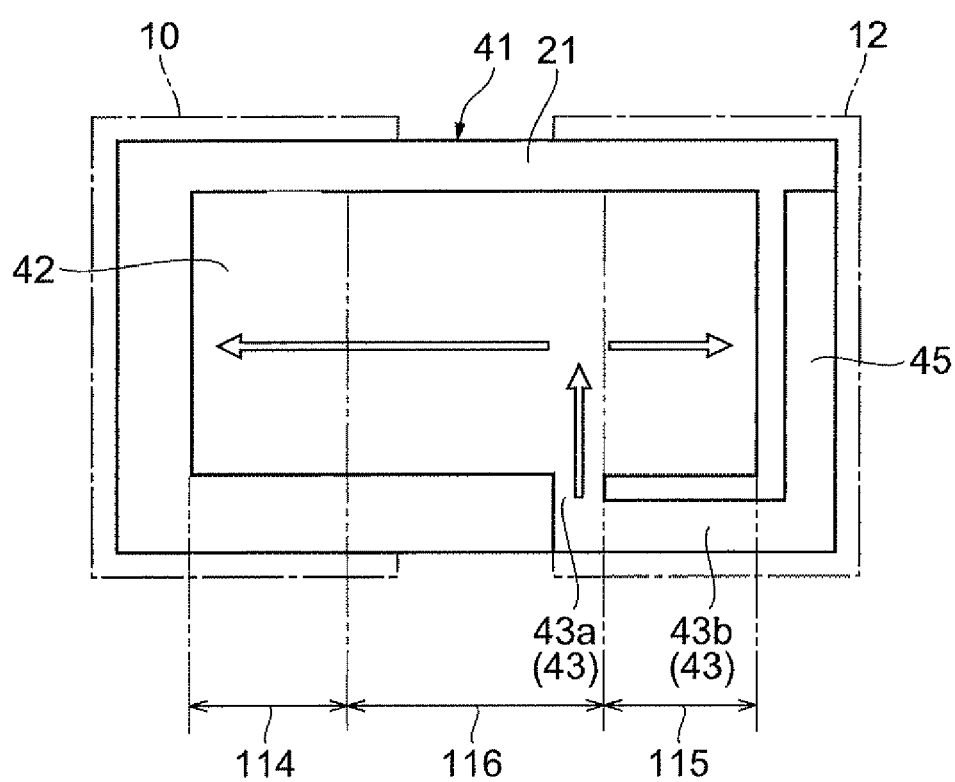

Still another modified example of the first embodiment will now be explained with reference to FIG. 5. FIG. 5 is a view showing structures of inner electrodes in the multilayer capacitor in accordance with this modified example of the first embodiment.

As with the multilayer capacitor C1 in accordance with the first embodiment, the multilayer capacitor in accordance with this modified example comprises an element body 1, a first terminal electrode 10, and a second terminal electrode 12 which are not depicted. The element body 1 has a plurality of insulating layers 21, a plurality of first inner electrodes 31, and a plurality of second inner electrodes 41.

In the multilayer capacitor in accordance with this modified example, as shown in FIG. 5, the first and second inner electrodes 31, 41 lack the third and fourth lead parts 34, 44 shown in FIG. 2.

The arrows in FIG. 5 indicate the directions of current flows when the first and second terminal electrodes 10, 12 are used as a cathode and an anode, respectively. Even in the absence of the third and fourth lead parts 34, 44, currents flowing through the end parts 14, 15 of the first main electrode 32 are directed opposite from those in the end parts 114, 115 of the second main electrode 42. As a result, magnetic fields caused by the currents in the first and second inner electrodes 31, 41 partly cancel each other out, whereby the ESL of the multilayer capacitor can be lowered.

Second Embodiment

Figure 6:
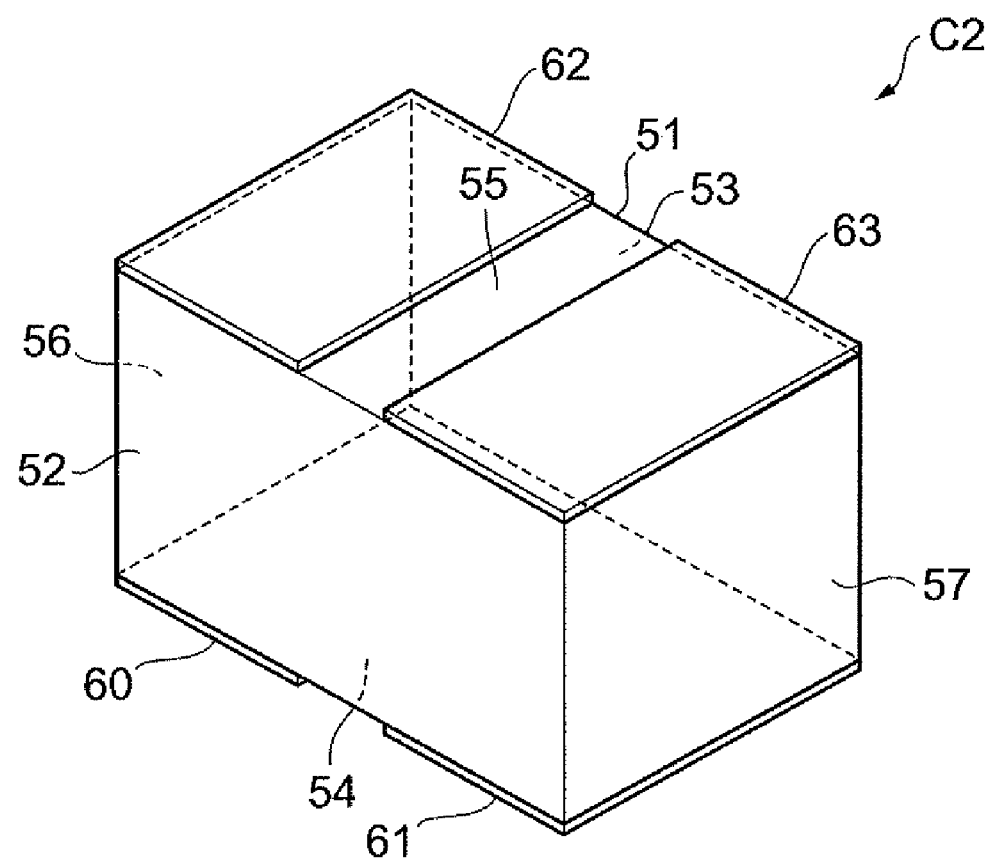
FIG. 6 is a perspective view of the multilayer capacitor in accordance with a second embodiment.
Figure 7:
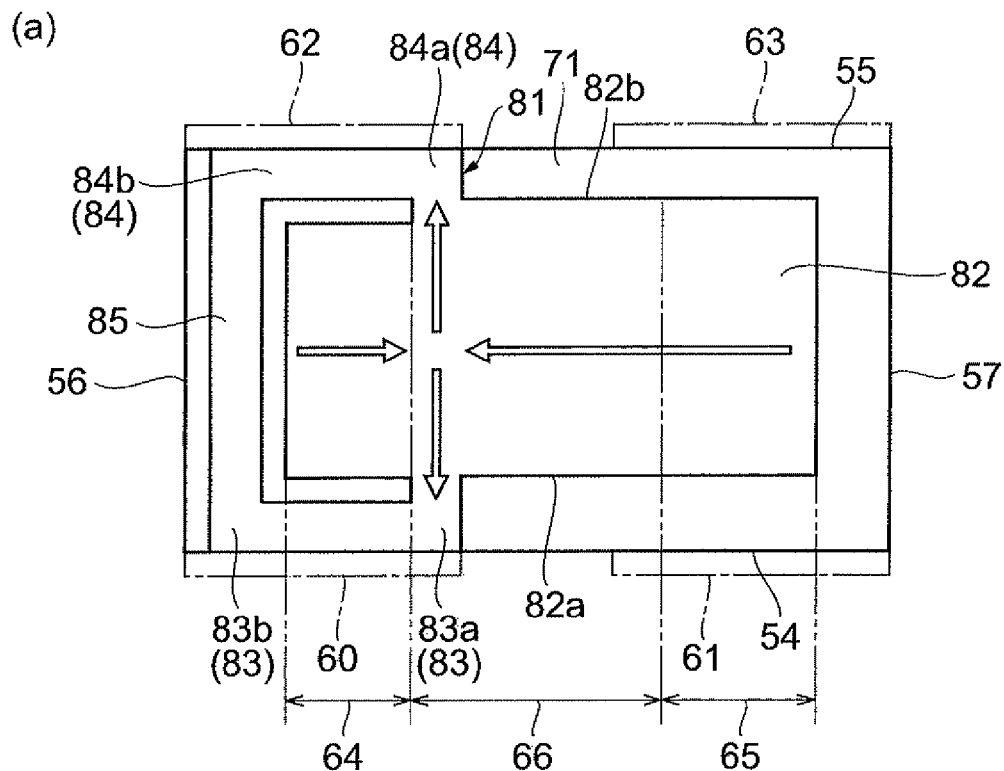
FIG. 7 is a view showing structures of inner electrodes in the multilayer capacitor in accordance with the second embodiment.
Figure 7:
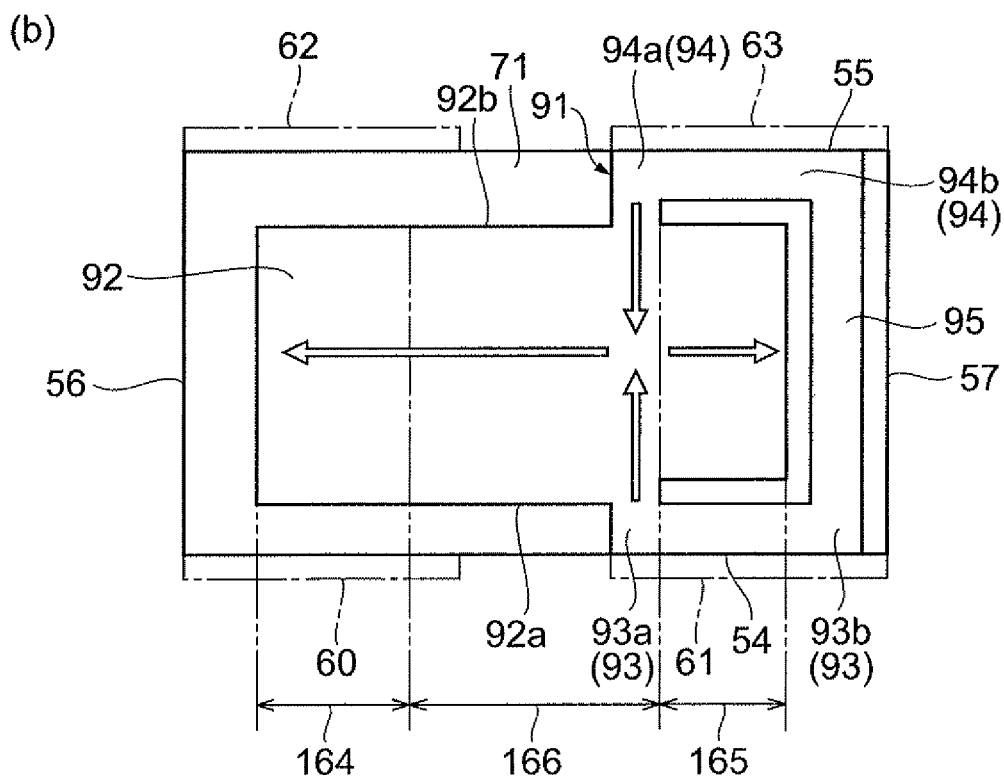

FIG. 6 is a perspective view of the multilayer capacitor in accordance with the second embodiment. FIG. 7 is a view showing structures of inner electrodes in the multilayer capacitor in accordance with the second embodiment.

As shown in FIG. 6, the multilayer capacitor C2 comprises an element body 51 shaped like a rectangular parallelepiped, and a first terminal electrode 60, a second terminal electrode 61, a third terminal electrode 62, and a fourth terminal electrode 63 which are arranged on outer surfaces of the element body 51. The element body 51 includes rectangular first and second main faces 52, 53, first and second side faces 54, 55 opposing each other, and third and fourth side faces 56, 57 opposing each other. The first and second side faces 54, 55 extend in the shorter side direction of the first and second main faces 52, 53 so as to connect the first and second main faces 52, 53 to each other. The third and fourth side faces 56, 57 extend in the longer side direction of the first and second main faces 52, 53 so as to connect the first and second side faces 54, 55 to each other. The first side face 54 becomes a mounting surface in the multilayer capacitor C2. When mounting the multilayer capacitor C2 to a mounting substrate (not depicted), the first side face 54 is opposed to the mounting substrate.

The first and second terminal electrodes 60, 61 are arranged on the first side face 54 of the element body 51. The first terminal electrode 60 is formed closer to the third side face 56, while the second terminal electrode 61 is formed closer to the fourth side face 57. The third and fourth terminal electrodes 62, 63 are arranged on the second side face 55 of the element body 51. The third terminal electrode 62 opposes the first terminal electrode 60, while the fourth terminal electrode 63 opposes the second terminal electrode 61. The first to fourth terminal electrodes 60 to 63 are not in contact with each other. The first to fourth terminal electrodes 60 to 63 are formed, for example, by applying and burning a conductive paste containing a conductive metal powder and glass frit onto their corresponding outer surfaces of the element body 51. A plating layer may be formed on the burned electrode when necessary.

As shown in FIG. 7, the element body 51 has a plurality of insulating layers 71, a plurality of first inner electrodes 81, and a plurality of second inner electrodes 91. Each of the insulating layers 71 extends in a direction parallel to the first and second main faces 52, 53. Therefore, the first to fourth side faces 54 to 57 are surfaces extending along the laminating direction of the insulating layers 71, while the first and second main faces 52, 53 are surfaces opposing each other in the laminating direction of the insulating layers 71. Each of the insulating layers 71 is constituted by a sintered body of a ceramic green sheet containing a dielectric ceramic, for example. In the actual multilayer capacitor C2, the insulating layers 71 are integrated to such an extent that their boundaries are invisible.

The first and second inner electrodes 81, 91 are alternately laminated with at least one insulating layer 71 interposed therebetween. The first and second inner electrodes 81, 91 are constituted by sintered bodies of a conductive paste.

As shown in FIG. 7(a), each first inner electrode 81 has a first main electrode 82, a first lead part 83, a third lead part 84, and a fifth coupling conductor 85. The first lead part 83 is exposed at the first side face 54 and connected to the first terminal electrode 60 electrically and physically. The third lead part 84 is exposed at the second side face 55 and connected to the third terminal electrode 62 electrically and physically. As a consequence, the first inner electrode 81 is electrically connected to the first and third terminal electrodes 60, 62.

The first main electrode 82 is shaped like a rectangle, whose longer side direction is that of the first and second main faces 52, 53. The first main electrode 82 has a pair of edge parts 82a, 82b extending in the longer side direction. The edge part 82a is positioned on the first side face 54 side, while the edge part 82b is positioned on the second side face 55 side.

The first main electrode 82 includes a first capacity forming area. The first capacity forming area is an area that overlaps a second main electrode 92, which will be explained later, when seen in the laminating direction of the insulating layers 71. In this embodiment, the first and second main electrodes 82, 92 totally overlap each other. Therefore, the first main electrode 82 as a whole becomes the first capacity forming area. The first capacity forming area, i.e., first main electrode 82, is constituted by end parts 64, 65 and an intermediate part 66. The end part 64 is positioned on the third side face 56 side of the element body 5, while the end part 65 is positioned on the fourth side face 57 side of the element body 51. The intermediate part 66 is positioned between the end parts 64, 65.

The first lead part 83 is connected to the first main electrode 82, while being positioned on the first side face 54 side when seen from the first main electrode 82. The first lead part 83 is constituted by a first coupling conductor 83a and a first lead conductor 83b.

The first coupling conductor 83a extends from the edge part 82a of the first main electrode 82 to the first side face 54 of the element body 51, while having one end connected to the edge part 82a of the first main electrode 82 and the other end exposed at the first side face 54. The connecting part between the first coupling conductor 83a and first main electrode 82 is located in the intermediate part 66 of the first main electrode 82 when seen in the opposing direction of the first and second side faces 54, 55.

The first lead conductor 83b extends along the first side face 54 of the element body 51 to the third side face 56. One end of the first lead conductor 83b is connected to the first coupling conductor 83a. In the lead conductor 83b, the surface extending along the first side face 54 is exposed at the first side face 54. The first lead conductor 83b is not exposed at the third side face 56.

The first lead conductor 83b is separated from the first main electrode 82 by a gap. Therefore, in the first lead part 83, only an end portion of the first coupling conductor 83a is connected to the first main electrode 82. In the remaining portion, the first lead part 83 and the first main electrode 82 are not in contact with each other.

The third lead part 84 is connected to the first main electrode 82, while being positioned on the second side face 55 side when seen from the first main electrode 82. The third lead part 84 is constituted by a third coupling conductor 84a and a third lead conductor 84b.

The third coupling conductor 84a extends from the edge part 82b of the first main electrode 82 to the second side face 55 of the element body 51, while having one end connected to the edge part 82b of the first main electrode 82 and the other end exposed at the second side face 55. The connecting part between the third coupling conductor 84a and first main electrode 82 is located in the intermediate part 66 of the first main electrode 82 when seen in the opposing direction of the first and second side faces 54, 55.

The third lead conductor 84b extends along the second side face 55 of the element body 51 to the third side face 56. The third lead conductor 84b has one end connected to the third coupling conductor 84a. In the third lead conductor 84b, the surface extending along the second side face 55 is exposed at the second side face 55. The lead conductor 84b is not exposed at the third side face 56.

The third lead conductor 84b is separated from the first main electrode 82 by a gap. Therefore, in the third lead part 84, only one end of the third coupling conductor 84a is connected to the first main electrode 82. In the remaining portion, the third lead part 84 and the first main electrode 82 are not in contact with each other.

The fifth coupling conductor 85 connects the first lead part 83 and third lead part 84 to each other. More specifically, the fifth coupling conductor 85 extends along the third side face 56 of the element body 51, while having one end connected to the other end part of the first lead conductor 83b in the first lead part 83 and the other end connected to the other end part of the third lead conductor 84b in the third lead part 84. The fifth coupling conductor 85 is not exposed at any side face of the element body 51. The fifth coupling conductor 85 is separated from the first main electrode 82 by a gap. Therefore, the fifth coupling conductor 85 and the first main electrode 82 are not in contact with each other.

As shown in FIG. 7(b), each second inner electrode 91 has a second main electrode 92, a second lead part 93, a fourth lead part 94, and a sixth coupling conductor 95. The second lead part 93 is exposed at the first side face 54 and connected to the second terminal electrode 61 electrically and physically. The fourth lead part 94 is exposed at the second side face 55 and connected to the fourth terminal electrode 63 electrically and physically. As a consequence, the second inner electrode 91 is electrically connected to the second and fourth terminal electrodes 61, 63. The second lead part 93, fourth lead part 94, and sixth coupling conductor 95 in the second inner electrode 91 are kept from overlapping the first lead part 83, third lead part 84, and fifth coupling conductor 85 in the first inner electrode 81. In the following, the constituents of the second inner electrode 91 will be explained in detail.

The second main electrode 92 is shaped like a rectangle, whose longer side direction is that of the first and second main faces 52, 53. The first main electrode 92 has a pair of edge parts 92a, 92b extending in the longer side direction. The edge part 92a is positioned on the first side face 54 side, while the edge part 92b is positioned on the second side face 55 side.

The second main electrode 92 includes a second capacity forming area. The second capacity forming area is an area that overlaps the first main electrode 82 when seen in the laminating direction of the insulating layers 71. In this embodiment, the first and second main electrodes 82, 92 totally overlap each other. Therefore, the second main electrode 92 as a whole becomes the second capacity forming area. The second capacity forming area, i.e., second main electrode 92, is constituted by end parts 164, 165 and an intermediate part 166. The end part 164 is positioned on the third side face 56 side of the element body 51, while the end part 165 is positioned on the fourth side face 57 side of the element body 51. The intermediate part 166 is positioned between the end parts 164, 165.

The second lead part 93 is connected to the second main electrode 92, while being positioned on the first side face 54 side when seen from the second main electrode 92. The second lead part 93 is constituted by a second coupling conductor 93a and a second lead conductor 93b.

The second coupling conductor 93a extends from the edge part 92a of the second main electrode 92 to the first side face 54 of the element body 51, while having one end connected to the edge part 92a of the second main electrode 92 and the other end exposed at the first side face 54. The connecting part between the second coupling conductor 93a and second main electrode 92 is located in the intermediate part 166 of the second main electrode 92 when seen in the opposing direction of the first and second side faces 54, 55.

The second lead conductor 93b extends along the first side face 54 of the element body 51 to the fourth side face 57. One end of the second lead conductor 93b is connected to the second coupling conductor 93a. In the second lead conductor 93b, the surface extending along the first side face 54 is exposed at the first side face 54. The second lead conductor 93b is not exposed at the fourth side face 57.

The second lead conductor 93b is separated from the second main electrode 92 by a gap. Therefore, in the second lead part 93, only one end of the second coupling conductor 93a is connected to the second main electrode 92. In the remaining portion, the second lead part 93 and the second main electrode 92 are not in contact with each other.

The fourth lead part 94 is connected to the second main electrode 92, while being positioned on the second side face 55 side when seen from the second main electrode 92. The fourth lead part 94 is constituted by a fourth coupling conductor 94a and a fourth lead conductor 94b.

The fourth coupling conductor 94a extends from the edge part 92b of the second main electrode 92 to the second side face 55 of the element body 51, while having one end connected to the edge part 92b of the second main electrode 92 and the other end exposed at the second side face 55. The connecting part between the fourth coupling conductor 44a and second main electrode 92 is located in the intermediate part 166 of the second main electrode 92 when seen in the opposing direction of the first and second side faces 54, 55.

The fourth lead conductor 94b extends along the second side face 55 of the element body 51 to the fourth side face 57. The fourth lead conductor 94b has one end connected to the fourth coupling conductor 94a. In the fourth lead conductor 94b, the surface extending along the second side face 55 is exposed at the second side face 55. The fourth lead conductor 94b is not exposed at the fourth side face 57.

The fourth lead conductor 94b is separated from the second main electrode 92 by a gap. Therefore, in the fourth lead part 94, only one end of the fourth coupling conductor 94a is connected to the second main electrode 92. In the remaining portion, the fourth lead part 94 and the second main electrode 92 are not in contact with each other.

The sixth coupling conductor 95 connects the second lead part 93 and fourth lead part 94 to each other. More specifically, the sixth coupling conductor 95 extends along the fourth side face 57 of the element body 51, while having one end connected to the other end part of the second lead conductor 93b in the second lead part 93 and the other end connected to the other end part of the fourth lead conductor 94b in the fourth lead part 94. The sixth coupling conductor 95 is not exposed at any side face of the element body 51. The sixth coupling conductor 95 is separated from the second main electrode 92 by a gap. Therefore, the sixth coupling conductor 95 and the second main electrode 92 are not in contact with each other.

In thus constructed multilayer capacitor C2 in accordance with the second embodiment, the first inner electrode 81 has the first coupling conductor 83a connecting the first lead conductor 83b and first main electrode 82 to each other, while the second inner electrode 91 has the second coupling conductor 93a connecting the second lead conductor 93b and second main electrode 92 to each other. The first and second coupling conductors 83a, 93a are connected to respective parts of the first and second main electrodes 82, 92. Therefore, current paths of the first and second inner electrodes 81, 91 are formed such as to include locations where they are narrowed, whereby the ESR of the multilayer capacitor C2 is enhanced.

The first and second coupling conductors 83a, 93a are positioned close to each other. The connecting part between the first coupling conductor 83a and first main electrode 82 and the connecting part between the second coupling conductor 93a and second main electrode 92 allow respective currents to flow in directions opposite from each other, whereby magnetic fields caused by the currents cancel each other out. As a result, the ESL of the multilayer capacitor C2 can be lowered. The arrows in FIG. 7 indicate the directions of current flows when the first and third terminal electrodes 60, 62 are used as cathodes, while second and fourth terminal electrodes 61, 63 are used as anodes.

Currents flowing through the end parts 64, 65 of the first main electrode 82 are directed opposite from those flowing through their corresponding end parts 164, 165 of the second main electrode 92. As a result, magnetic fields caused by the currents in the first and second inner electrodes 81, 91 partly cancel each other out, whereby the ESL of the multilayer capacitor C2 can further be lowered.

When the multilayer capacitor C2 is mounted to a mounting substrate, currents flow through the path reaching the first main electrode 82 through the first lead part 83 and the path reaching the first main electrode 82 through the third lead part 84. When the multilayer capacitor C2 is mounted to the mounting substrate, since the first side face 54 is a mounting surface, the current path reaching the first main electrode 82 through the fifth coupling conductor 85 and third lead part 84 is longer than the current path reaching the first main electrode 82 through the first lead part 83. Because of the same reason, the current path reaching the second main electrode 92 through the sixth coupling conductor 95 and fourth lead part 94 is longer than the current path reaching the second main electrode 92 through the second lead part 93. Since such longer current paths are formed, the ESR of the multilayer capacitor C2 increases.

The first and second inner electrodes 81, 91 are connected to the terminal electrodes on the third and fourth side faces 56, 57 only on the first and second side faces 54, 55 of the element body 51, but not on the third and fourth side faces 56, 57. This yields a greater resistance component than that in the case where the first and second inner electrodes 81, 91 connect with the terminal electrodes in areas extending over the first to fourth side faces 54 to 57, whereby the ESR of the multilayer capacitor can further be enhanced. By changing the widths of the fifth and sixth coupling conductors 85, 95 that are not exposed at the element body 51, the ESR can be controlled easily and accurately.

Figure 8:
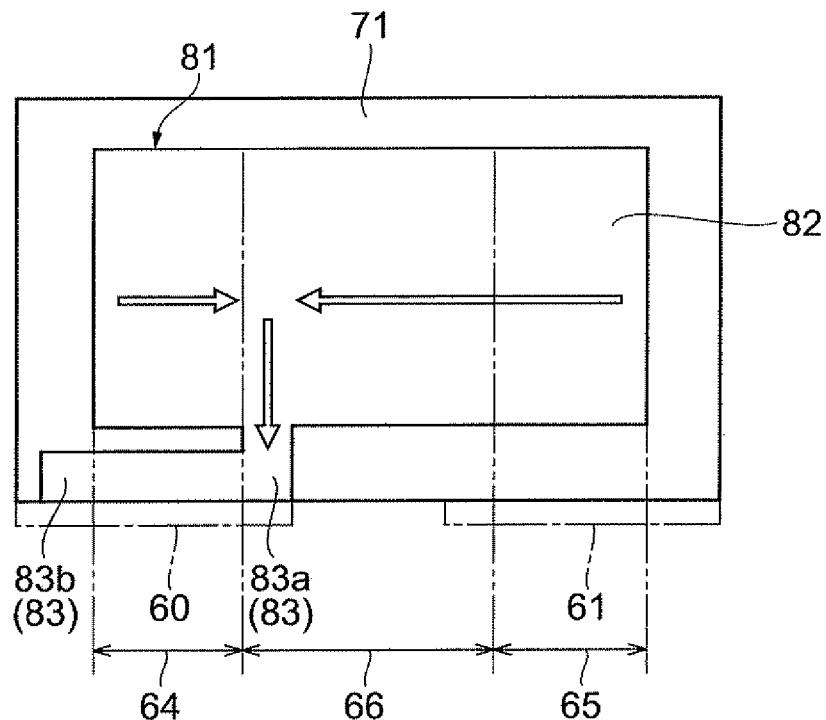
FIG. 8 is a view showing structures of inner electrodes in the multilayer capacitor in accordance with a modified example of the second embodiment.
Figure 8:
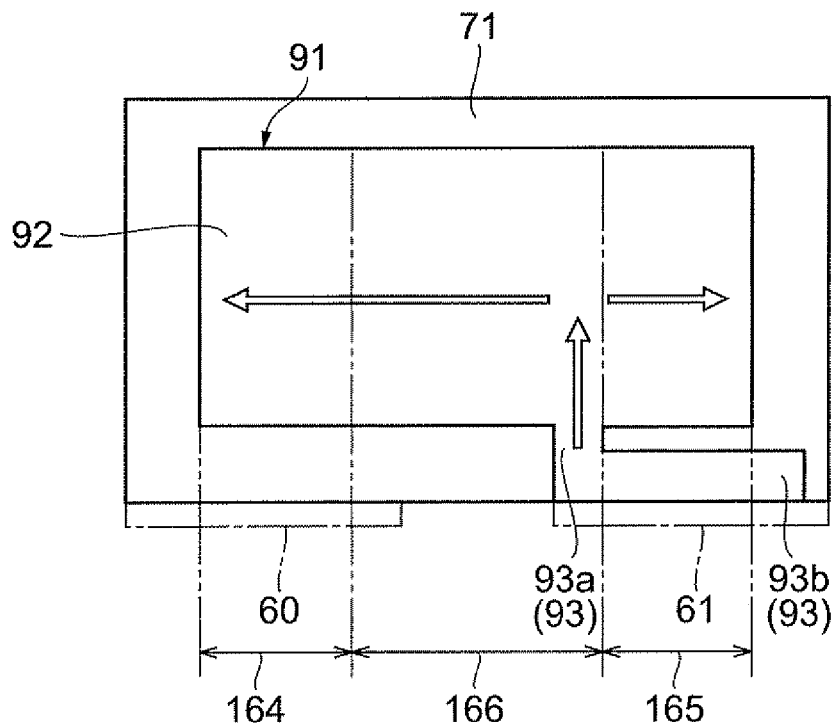

A modified example of the second embodiment will now be explained with reference to FIG. 8. FIG. 8 is a view showing structures of inner electrodes in the multilayer capacitor in accordance with this modified example of the second embodiment.

As with the multilayer capacitor C2 in accordance with the second embodiment, the multilayer capacitor in accordance with this modified example comprises an element body 51, a first terminal electrode 60, and a second terminal electrode 61 which are not depicted. However, the multilayer capacitor in accordance with this modified example differs from the multilayer capacitor C2 in accordance with the second embodiment in that it lacks the third and fourth terminal electrodes 62, 63.

As shown in FIG. 8, the element body 51 has a plurality of insulating layers 71, a plurality of first inner electrodes 81, and a plurality of second inner electrodes 91. In the multilayer capacitor in accordance with this modified example, the first and second inner electrodes 81, 91 lack the third and fourth lead parts 84, 94 and fifth and sixth coupling conductors 85, 95 shown in FIG. 7.

The arrows in FIG. 8 indicate the directions of current flows when the first and second terminal electrodes 60, 61 are used as a cathode and an anode, respectively. Currents flowing through the end parts 64, 65 of the first main electrode 82 are directed opposite from those in the end parts 164, 165 of the second main electrode 92. As a result, magnetic fields caused by the currents in the first and second inner electrodes 81, 91 partly cancel each other out, whereby the ESL of the multilayer capacitor can be lowered.

Though preferred embodiments of the present invention are explained in the foregoing, the present invention is not necessarily limited to the above-mentioned embodiments, but can be modified in various ways within the scope not deviating from the gist thereof.

For example, the element body is shaped like a rectangular parallelepiped in the above-mentioned embodiments but not restricted thereto. The first and second main electrodes are not limited to the rectangular forms mentioned above.

Though the first and second main electrodes totally overlap each other in the above-mentioned embodiments, they may partly overlap each other.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising an element body having first and second inner electrodes alternately laminated with an insulating layer interposed therebetween, and first and second terminal electrodes arranged on an outer surface of the element body while being insulated from each other, a surface extending along the laminating direction in side faces of the element body acting as a mounting surface;

wherein, as the side faces, the element body has first and second side faces extending along the laminating direction while opposing each other, and third and fourth side faces extending along the laminating direction and a direction intersecting the first and second side faces while opposing each other;

wherein the first inner electrode of the element body has a first main electrode, a first coupling conductor extending to the first side face while being connected to an end part positioned on the first side face side of the first main electrode, and a first lead conductor connected to the first coupling conductor and exposed out of the element body while extending to the third side face so as to connect with the first terminal electrode;

wherein the second inner electrode of the element body has a second main electrode, a second coupling conductor extending to the first side face while being connected to an end part positioned on the first side face side of the second main electrode, and a second lead conductor connected to the second coupling conductor and exposed out of the element body while extending to the fourth side face so as to connect with the second terminal electrode;

wherein the first coupling conductor and first lead conductor are kept from overlapping the second coupling conductor and second lead conductor when seen in the laminating direction;

wherein the first and second lead conductors are separated from the first and second main electrodes by gaps, respectively;

wherein the first and second main electrodes include respective first and second capacity forming areas overlapping each other when seen in the laminating direction;

wherein a connecting part between the first main electrode and the first coupling conductor is positioned between an end part on the third side face side and an end part on the fourth side face side in the first capacity forming area when seen in the opposing direction of the first and second side faces; and wherein a connecting part between the second main electrode and the second coupling conductor is positioned between an end part on the third side face side and an end part on the fourth side face side in the second capacity forming area when seen in the opposing direction of the first and second side faces.

2. A multilayer capacitor according to claim 1, wherein the first side face is the mounting surface;

wherein the first and second terminal electrodes are arranged on the first side face; and wherein respective side faces of the first and second lead conductors along the extending direction are exposed at the first side face.

3. A multilayer capacitor according to claim 2, wherein the first terminal electrode is arranged on the first, second, and third side faces;

wherein the second terminal electrode is arranged on the first, second, and fourth side faces;

wherein the first inner electrode further has a third coupling conductor extending to the second side face while being connected to an edge part on the second side face side of the first main electrode, and a third lead conductor extending to the third side face while being connected to the third coupling conductor and exposed at least one of the second and third side faces so as to connect with the first terminal electrode;

wherein the second inner electrode further has a fourth coupling conductor extending to the second side face while being connected to an edge part on the second side face side of the second main electrode, and a fourth lead conductor extending to the fourth side face while being connected to the fourth coupling conductor and exposed at least one of the second and fourth side faces so as to connect with the second terminal electrode;

wherein the third coupling conductor and third lead conductor are kept from overlapping the fourth coupling conductor and fourth lead conductor when seen in the laminating direction;

wherein the third and fourth lead conductors are separated from the first and second main electrodes by gaps, respectively;

wherein a connecting part between the first main electrode and the third coupling conductor is positioned between an end part on the third side face side and an end part on the fourth side face side in the first capacity forming area when seen in the opposing direction of the first and second side faces; and wherein a connecting part between the second main electrode and the fourth coupling conductor is positioned between an end part on the third side face side and an end part on the fourth side face side in the second capacity forming area when seen in the opposing direction of the first and second side faces.

4. A multilayer capacitor according to claim 3, wherein respective side faces of the third and fourth lead conductors along the extending direction are exposed at the second side face.

5. A multilayer capacitor according to claim 4, wherein the first inner electrode further has a fifth coupling conductor for connecting the first and third lead conductors to each other;

wherein the second inner electrode further has a sixth coupling conductor for connecting the second and fourth lead conductors to each other;

wherein the fifth and sixth coupling conductors are separated from the first and second main electrodes by gaps, respectively;

wherein the fifth coupling conductor is exposed at the third side face and connected to the first terminal electrode; and wherein the sixth coupling conductor is exposed at the fourth side face and connected to the second terminal electrode.

6. A multilayer capacitor according to claim 3, wherein the first inner electrode further has a fifth coupling conductor for connecting the first and third lead conductors to each other;

wherein the second inner electrode further has a sixth coupling conductor for connecting the second and fourth lead conductors to each other;

wherein the fifth and sixth coupling conductors are separated from the first and second main electrodes by gaps, respectively;

wherein the fifth coupling conductor is exposed at the third side face and connected to the first terminal electrode; and wherein the sixth coupling conductor is exposed at the fourth side face and connected to the second terminal electrode.

7. A multilayer capacitor according to claim 2, wherein the first inner electrode further has a third coupling conductor extending to the second side face while being connected to an edge part on the second side face side of the first main electrode, a third lead conductor extending to the third side face while being connected to the third coupling conductor, and a fifth coupling conductor for connecting the first and third lead conductors to each other;

wherein the second inner electrode further has a fourth coupling conductor extending to the second side face while being connected to an edge part on the second side face side of the second main electrode, a fourth lead conductor extending to the fourth side face while being connected to the fourth coupling conductor, and a sixth coupling conductor for connecting the second and fourth lead conductors to each other;

wherein the third coupling conductor and third lead conductor are kept from overlapping the fourth coupling conductor and fourth lead conductor when seen in the laminating direction;

wherein the third lead conductor and fifth coupling conductor are separated from the first main electrode by a gap;

wherein the fourth lead conductor and sixth coupling conductor are separated from the second main electrode by a gap;

wherein a connecting part between the first main electrode and third coupling conductor is positioned between end parts on the third and fourth side face sides of the first capacity forming area;

wherein a connecting part between the second main electrode and fourth coupling conductor is positioned between end parts on the third and fourth side face sides of the second capacity forming area; and wherein the fifth and sixth coupling conductors are held within the element body.

8. A multilayer capacitor according to claim 7, wherein third and fourth terminal electrodes insulated from each other are arranged on the second side face;

wherein a side face of the third lead conductor along the extending direction is exposed at the second side face and connected to the third terminal electrode; and wherein a side face of the fourth lead conductor along the extending direction is exposed at the second side face and connected to the fourth terminal electrode.

* * * * *